United States Patent [19]

Tandon et al.

[11] 4,151,573
[45] Apr. 24, 1979

[54] MAGNETIC RECORDING DEVICE FOR DOUBLE SIDED MEDIA

[75] Inventors: Sirjang L. Tandon, Northridge; Alfred C. Hackney, Simi Valley; Roy A. Applequist, Sunnyvale, all of Calif.

[73] Assignee: Tandon Magnetics Corp., Chatsworth, Calif.

[21] Appl. No.: 805,731

[22] Filed: Jun. 13, 1977

[51] Int. Cl.[2] .............................................. G11B 5/58
[52] U.S. Cl. .................................. 360/104; 360/130.1
[58] Field of Search ................ 360/105, 104, 106, 75, 360/78, 133, 99, 130, 102–103

[56] References Cited

U.S. PATENT DOCUMENTS

| | | | |
|---|---|---|---|
| 3,170,149 | 2/1965 | Koskie et al. | 360/106 |
| 3,879,757 | 4/1975 | Elliott et al. | 360/99 |
| 3,879,759 | 4/1975 | Matsui | 360/106 |
| 3,931,641 | 1/1976 | Watrous | 360/104 |
| 3,975,774 | 8/1976 | Helbers | 360/130 |
| 3,984,872 | 10/1976 | Beecroft | 360/105 X |

FOREIGN PATENT DOCUMENTS

1467218  3/1977  United Kingdom .................... 360/99

OTHER PUBLICATIONS

I.B.M. Technical Disclosure Bulletin, vol. 18, No. 7, Dec. '75, pp. 2246, 2247.
I.B.M. Technical Disclosure Bulletin, vol. 18, No. 12, May '76, pp. 4112–4114.

*Primary Examiner*—John H. Wolff
*Attorney, Agent, or Firm*—Fraser and Bogucki

[57] ABSTRACT

In a data storage system using a non-rigid magnetic storage surface, such as a floppy disc, and in which recording and reproduction are to be effected on both sides of the element by contact transducers, significant improvements over prior art devices are realized by employing a fixed transducer on one side of the element, and a movable transducer element on the opposite side. The movable transducer may be gimbal mounted on a pivoted spring-loaded arm of low mass and high stiffness to urge the magnetic storage surface against the fixed transducer with a light force. The force is adequate, together with a slight penetration of the fixed transducer into the plane of the disc, to correct deflections of the storage surface in directions transverse to its principal plane in the region between the transducers. Thus the transducers are maintained in operative relation for maximum flux interchange, but without introducing undue wear or requiring a long head settling time.

16 Claims, 5 Drawing Figures

U.S. Patent    Apr. 24, 1979    Sheet 1 of 2    4,151,573
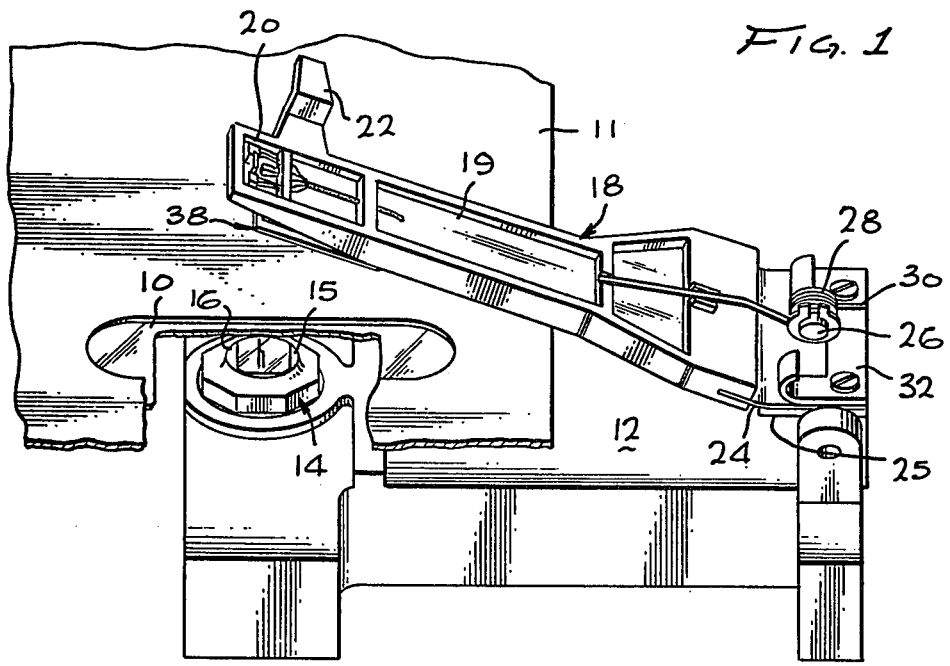
FIG. 1
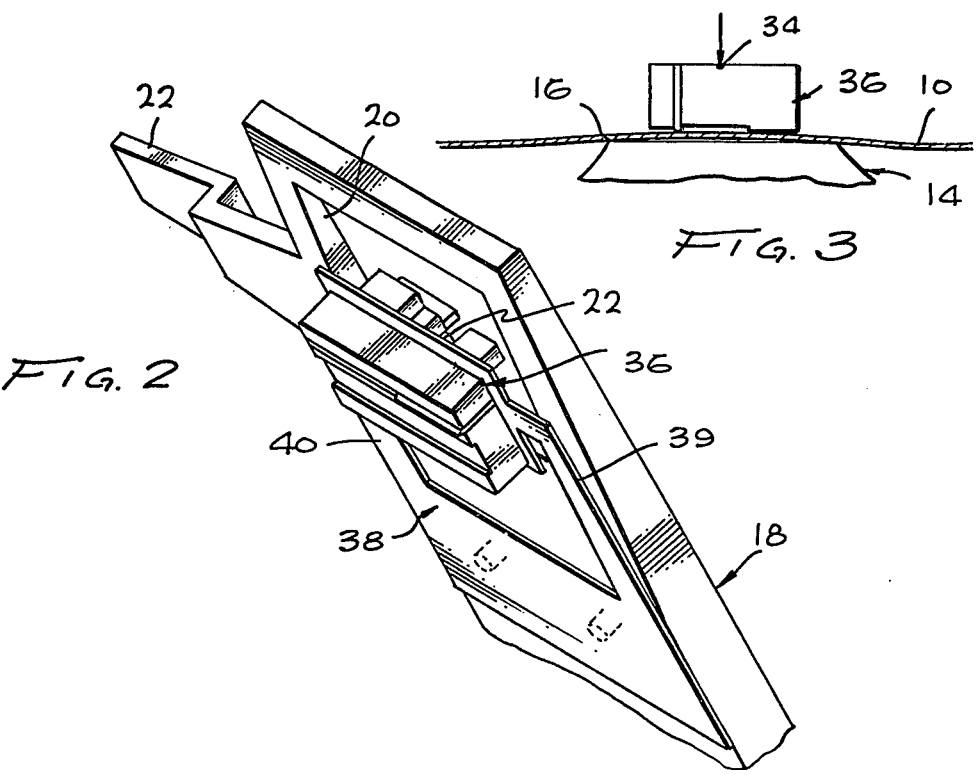
FIG. 2
FIG. 3

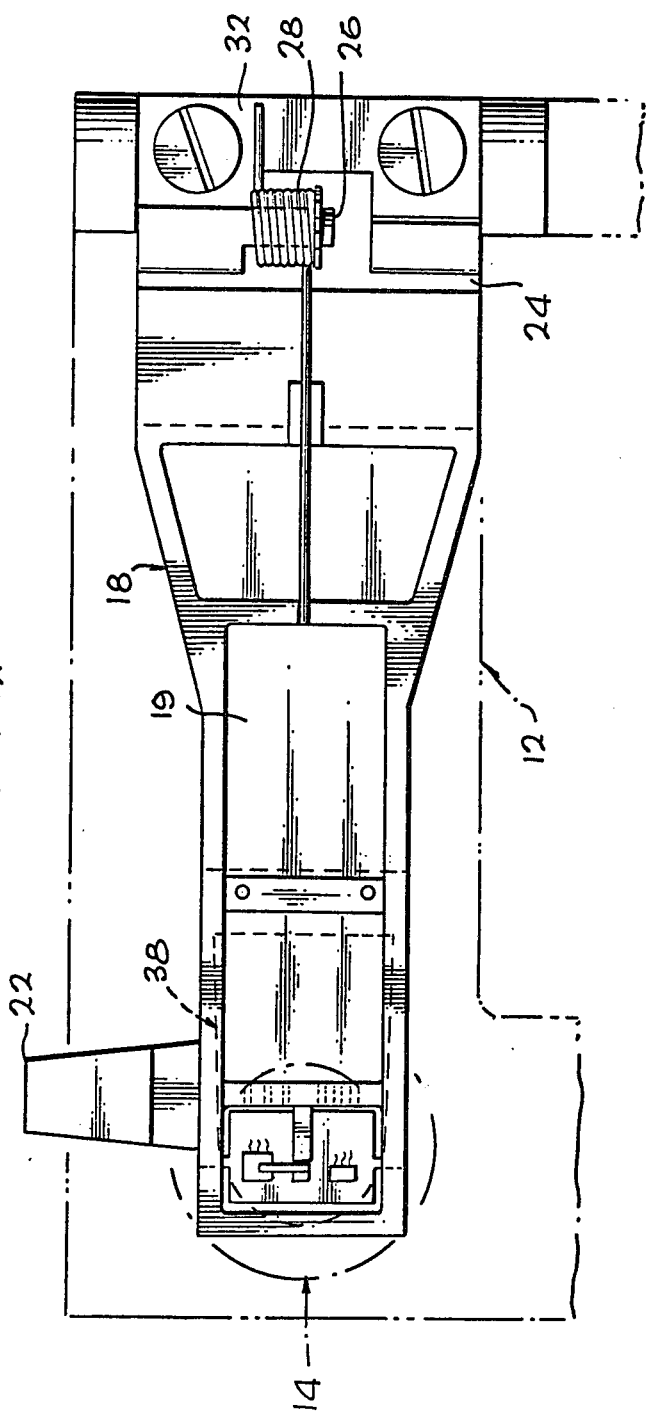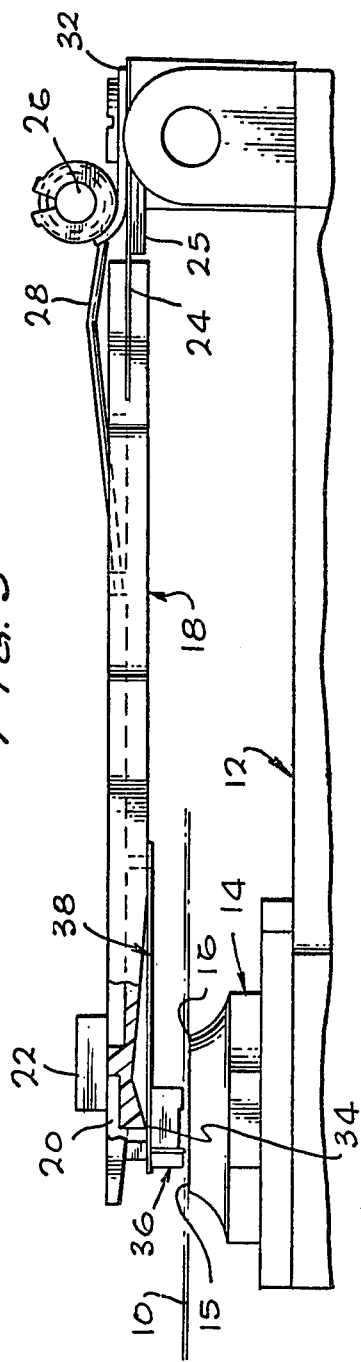

MAGNETIC RECORDING DEVICE FOR DOUBLE SIDED MEDIA

BACKGROUND OF THE INVENTION

Subsequent to early work on disc and drum files for data processing systems, usage of contact recording was generally dropped as air bearing magnetic heads and associated support mechanisms were developed for "flying" a transducer at a small spacing from a magnetic recording surface, to permit intimate interaction between the transducer and the magnetic surface. Contact recording continued to be used in magnetic tape systems, for which multi-channel heads were typically employed. However, contact recording for disc media was revived with the introduction of the so-called "floppy" disc system, in which a thin pliant disc element contained within a cover jacket was used in combination with low cost accessing, transducing and control systems. Floppy disc systems have subsequently found widespread application not only in the program storage and entry applications for which they were originally intended, but also in a wide variety of data entry, storage and control applications. In the original systems, and since that time, the transducer structure generally comprises a single channel head with associated erase head, mounted in a transducer having a contact surface that is a segment of a spheroid or at least curved, the transducer itself being mounted in a carriage element that is accessed to different circumferential tracks on the floppy disc. On the opposite side of the disc from the transducer, and also in contact with the disc, is a pressure pad mounted adjacent the end of a spring-loaded arm, which is solenoid controllable so as to be free to exert pressure when data transfer operations are to take place.

Recently, however, the floppy disc industry has started to use both sides of the floppy disc for data transfer operations, the purpose primarily being to increase capacity. Thus only a single relatively low speed accessing mechanism continues to be employed, and the transducers on opposite sides of the element are in a generally opposed relation, with only a slight offset in the head gaps to avoid flux interaction. Because it is thought necessary to account for perturbations in movement of the flexible disc from its principal plane, recording heads and mounts are utilized that are essentially derived from the flying head technology. Specifically, a pair of small, identical slider heads are used, each mounted adjacent the end of a long resilient cantilevered head support, and mechanically urged together with a total force of approximately 8 grams. The concept is that as the flexible disc deviates from its principal plane, both of the heads tend to follow the actual position of the disc passing between them and permit contact recording without excessive wear or signal degradation. Accepted industry standards for functional specifications are 1,000,000 revolutions without substantial degradation in reproduced signal amplitude, and 3,000,000 revolutions without significant head wear.

There are, however, significant problems and limitations arising from the use of this double, symmetrical and very compliant head mechanism. The resilient mounts are relatively complex and must be precisely manufactured, and therefore are costly to manufacture and maintain. Furthermore, they require redesign, by each floppy disc manufacturer, of the carriage, head support mechanisms and associated structure, becase they have volumetric configurations incompatible with current structures. In addition, the head loading force and the mechanical configuration require that special provision be made to insure that the head does not constantly land at the same point and thereby cause undue wear. In addition, the long flexible columns used in the existing type of structure tend to bend in a slight S shape or shift differentially in response to perturbations in the disc surface position. This introduces both a degree of offset relative to the track center, reducing reproduced signal amplitude and tending to limit the positional accuracy which can be obtained, which in turn limits the track density which can be achieved. Furthermore, the two resiliently mounted heads do not settle quickly into operative relation, once landed on the disc, and this delay must be taken into account before data transfer operations can begin. Of great importance from the standpoint of the floppy disc systems manufacturer is the fact that he not only cannot use a portion of his existing inventory for heads and carriages, but must redesign a portion of his system for the new double sided configuration.

There are currently recognized both distinctions and similarities between contact and non-contact recording. In non-contact recording the purpose is to employ an aerodynamic effect to fly the transducer at given spacing above the record medium. This distance is decreasing as the art advances and some current systems use a little as 10–20 microinches, but a primary objective is to avoid contact or "head crash" during rotation. In contact recording a film of air is actually interposed between the head and the record medium during operation, but this is typically only a few microinches. In contact recording frictional contact and wear are inherent, and the head design must accommodate these factors. It can be seen, however, that in operative use both types use an air bearing effect and that the distinction is growing less clear as non-contact types fly at smaller heights and floppy discs are driven faster.

SUMMARY OF THE INVENTION

A device for effecting data recording and reproduction operations with each of the two sides of a pliant, non-rigid magnetic record element employs a fixed transducer on one side and a resilient element supporting a movable transducer on the other. An asymmetrical system is thus provided in which the record element is deflected by the fixed transducer but confined against the fixed transducer, despite perturbations in its movement, by the movable transducer. The movable transducer may be a smaller slider transducer that is mounted via a short length gimbal adjacent the end of a spring-loaded pivotable support arm. The arm mechanism urges the slider transducer and the intervening record element against the surface of the fixed transducer with a light force, although the fixed transducer is positioned to penetrate slightly into the nominal plane of the record element. The configuration of the spring-loaded arm mounting the slider transducer is compatible with the configuration of the mechanism ordinarily supporting a pressure pad, so that the structure is thus directly substitutable in the space avilable in the prior single sided system. The spring-loaded support arm has a high damping coefficient and effectively holds the flexible magnetic recording element against the fixed transducer, at a precise radial position, as well as correcting deflections of the record element, although wear is less than in existing double sided systems.

In a specific example of a construction in accordance with the invention, as used with a floppy disc system, a fixed transducer mounted on a conventional carriage has a flat apex forming a contact surface and an annular spheroidal rim. By shaping the rounded rim after the flat apex is formed, wear is minimized due to the blending of the surfaces. A small slider head, at least no greater in area than the flat area of the fixed transducer, is engageable against the opposite side of the floppy disc, to urge the disc against the fixed transducer, which is positioned to penetrate slightly into the plane of the disc. To maintain the operative relation on both sides, a torsion spring on a pivotable support arm is coupled to the carriage. A load of less than about 20 grams is exerted at a central load point on the slider head, which is mounted in a short length gimbal mount so as to have freedom of movement in two directions relative to the plane of the disc. Lead wires coupled to the heads extend along the load arm to the region of its pivot axis for making external electrical connection. This arrangement not only has a short settling time, but meets all specifications for wear and reproduced signal amplitudes, while permitting high positional accuracy.

BRIEF DESCRIPTION OF THE DRAWINGS

A better understanding of the invention may be had by reference to the following description, taken in conjunction with the accompanying drawings, in which:

FIG. 1 is a perspective view, partially broken away, of the principal elements of a transducer system or recording on both sides of a flexible media, in which the accessing mechanism and associated parts of the system have been omitted for simplicity;

FIG. 2 is an enlarged perspective view of a portion of the arrangement of FIG. 1, showing further details of the slider head;

FIG. 3 is a side fragmentary view of the mechanism of FIGS. 1 and 2, showing the disposition of the heads and the flexible media during operation;

FIG. 4 is a plan view of the arrangement of FIG. 1; and

FIG. 5 is a side view, partially broken away, of the arrangement of FIGS. 1 and 4.

DETAILED DESCRIPTION OF THE INVENTION

Referring to the Figures, the invention is described hereafter as it is structured for use with a floppy disc system, but inasmuch as such systems are widely used, only a fragment of the flexible disc 10 and its encompassing jacket cover 11 having an access slot through which the heads can come in contact with the disc, are shown for brevity and simplicity. Reference may be made to U.S. Pat. No. 3,879,757, and a number of other patents, for details of such features as the central hub and spindle means for gripping and rotating the flexible disc 10, the front cover which may be pivoted open to permit loading and unloading of the disc, and a lead screw or other type of radial accessing mechanism for driving the carriage 12 along the access opening in the disc cover 11 to a selected radial track position.

Adjacent the free end of the carriage 12 is mounted what is referred to as a fixed transducer, which may for example be of the type known as a "button head" transducer 14. Other types of transducers may be utilized inasmuch as a number of types are used with floppy disc systems, but they typically have a convex surface facing the disc 10. They generally employ a read/write head for a single track and adjacent trim erase heads, which need not be described in further detail. The fixed transducer 14 is positioned to penetrate or intercept the nominal plane of the disc 10 slightly (as best seen in FIG. 3). Whereas the typical button head 14 has a rounded top of approximately 2" radius for contact with a flexible disc, the apex of the button head, which principally contacts the disc 10 is a flat apex portion 15 of approximately 0.2" diameter. Preferably the head surface is first shaped flat, and a spheroidal convex rim 16 is then formed, to blend or smooth the intersection between the flat and curved surfaces so as to minimize wear. The rim 16 has a 2" radius of curvature in this example.

At the end of the carriage 12, spaced apart from the button head 14, is pivotally mounted a low mass, relatively stiff cantilevered upper support or load arm 18 having thinned areal sections 19 along its length for purposes of reducing weight without reducing rigidity. A small areal aperture 20 is also provided adjacent the free end of the upper load arm 18, within which aperture the magnetic heads and associated energizing coils are coextensively disposed. Also adjacent the free end is a landing control tab 22 engageable by a solenoid operated element (not shown) to permit automatic pivoting of the load arm 18 away from the button head 14, as in the position shown in FIG. 1, or to release the arm 18 to permit engagement or "landing" of the magnetic head on the flexible disc 10 as shown in FIG. 3.

The base end of the load arm 18 is coupled to the adjacent end of the carriage 12 by a light flexure spring 24 which permits pivoting movement away from the button head 14. The spring 24 engages a head load stop 25 at one position as seen in FIG. 5 to define the limit for movement in the direction toward the fixed transducer 14. A cylindrical mandrel 26 coupled to the carriage adjacent the pivot end of the load arm 18 is encompassed by a torsional load spring 28 having an elongated linear end running longitudinally against the body of the load arm 18, to spring load the arm 18 in the direction toward the fixed transducer 14. A keeper 32 on the end of the mandrel 26 maintains the load spring 28 in position, once mounted.

Adjacent the areal aperture 20 proximate the free end of the load arm 18, a tapered tab on the arm terminates in a load point 34 facing in the direction toward the fixed transducer 14. The load point 34 engages the central region of a small rectangular slider head 16, which comprises an abrasion resistant barium titanate pad having an embedded ferrite head and adjacent trim erase heads as previously described. The magnetic core elements and energizing windings (both shown only generally) are disposed on the opposite side from the disc 10 and coupled to the slider head 36. As best seen in FIG. 2, a central groove is included on the underside of the slider head 36, parallel to the direction of relative motion between the disc 10 and the slider head 36, to permit air passage therebetween and to reduce air bearing effects at the speeds of revolution involved for the flexible disc 10 (nominally 360 rpm).

The slider head 36 is mounted at the end of a short length two axis gimbal spring 38 which comprises a base affixed at a radial spacing along the load arm 18 from the slider head 36, and includes a pair of elongated side arms 39, 40. Thus even though the slider head 36 remains in contact with the disc 10, and maintains the disc 10 against the fixed transducer 14 under normal conditions of operation, it is also able to tilt to some extent about the load point 34 to compensate for major radial or circumferential deflections of the disc 10 from its nominal plane. Deflections can occur despite the fact that the disc 10 is confined within the jacket cover 11, because of the center drive arrangement, the pliant nature of the disc, and the frictional loads on the surface of the disc.

In a typical operation of the mechanism of FIGS. 1-5, the carriage 12 begins at a selected radial position or track relative to the recording surface of the disc 10, and is to be advanced or retracted along the radius intersecting the axis opening in the disc cover 11 to a different track position, for which purpose the accessing mechanism (not shown) is actuated in conventional fashion. Prior to data transfer, the solenoid actuated mechanism (also not shown) engaging the landing control tab 22 on the cantilevered upper load arm 18 is energized, permitting the torsional load spring 28 to urge the slider head 36 onto the facing surface of the disc 10. Thus the disc 10 is confined between the flat surface 15 of the fixed transducer 14 and facing surface of the slider head 36, and there is a slight penetration of the fixed transducer 14 into the plane of the disc, and concurrent curvature of the disc in the region encompassing the fixed transducer 14. Under a force of approximately 14 grams exerted by the torsional load spring 28 against the slider head 36, the facing surfaces of the button head 14 and the slider head 36 are held substantially parallel. Deflections of the disc 10 occurring prior to entry between the heads 14, 36 are corrected, so that recording or reproduction may take place with either surface of the disc 10. The recording gaps at the fixed transducer 14 and the slider head 36 are slightly displaced relative to each other along a radius of the disc 10, but the head gaps are essentially along the same radius, which also intersects the load point 34. The light force (typically less than approximately 20 grams) exerted via the load point 34 against the slider head 36 is sufficient to maintain both heads in close operative relation with the opposite sides of the disc 10, producing high reproduced signal amplitudes, and good recording. The slight wrapping of the pliant disc 10 about the surface of the fixed transducer 14 provides a part of the function of insuring close or contacting relation, and the remainder of the corective action needed is supplied by the force of the slider transducer 36. Advantageously, the area of the face of the slider transducer 36 is smaller than the flat area 15 of the fixed transducer 14, but it is at least no greater. If there are large radial or circumferential, or both, deviations of the disc from its nominal plane, the gimbal spring 38 deflects by pivoting about the load point 34, so as to follow the contour of the disc 10. Normally, however, there is no such substantial or significant deviation of the disc 10 away from the flat surface 15 of the fixed transducer 14. Consequently, reproduced signal amplitude is maintained under all conditions of operation, even though the loading force is relatively low.

It will thus be appreciated by those skilled in the art that a significant factor is that the fixed transducer 14 provides a physical reference for the disc 10, and that the slider head 36, although lightly loaded against the disc 10, is held by a low mass load arm 18 having a high damping coefficient. The low force loading limits wear both on the contact surfaces of the transducers and on the facing surfaces of the disc, insuring a longer life if all other conditions are equal. In addition, positional accuracy is assured by the use of the fixed transducer 14 on the carriage and the slider head 36 on the stiff cantilevered load arm 18. The gimbal spring 38 has only relatively short length side arms 39, 40 and there is no tendency for these columnar elements to buckle or displace the slider head 36. Consequently, the device can readily be used in double density systems in which the number of tracks per inch is essentially doubled, and track offset effects are minimized.

Furthermore, the stiffness of the load arm, together with the light loading force, assures a very low abrasive effect at impact, which usually tends to occur within a limited region relative to an index position, and because of which special timing schemes have been required to be used with prior art systems in order to avoid excessive landing wear. The "settle" time of the heads, which denotes the time required for the heads to be assured of maintaining contact after initial impact, is substantially shortened and therefore the access time is on the average correspondingly reduced. The gimbal mechanism has adequate freedom of movement in two axes and thus can adjust in response to major deflections in the disc in either the radial or circumferential directions. Such advantages are achieved, in accordance with the instant example, by utilizing a load arm with a high damping coefficient and a short gimbal spring with small deflection. This arrangement provides a highly damped stiff gimbaling system. With a load arm of glass fiber-filled polycarbonate the mass of the arm is less than 3 grams.

It is of course significant that the mechanism disclosed is compatible with the envelope configurations of most prior art single sided recording systems for floppy disc drives. In consequence, the double head mechanism may be used as a direct substitute for head mechanisms in existing drives, merely by coupling to the accessing mechanism. The carriage can be the same as existing carriages, except for the additional provision of the pivot mount and the mount and support for the torsional load spring. Another advantage derives from the annular curved rim on the fixed transducer, which enables the disc to ramp over the fixed transducer when loading or unloading.

While a number of alternatives and modifications have been discussed above, it will be appreciated that the invention encompasses all forms and variations within the scope of the appended claims.

We claim:

1. A device for maintaining a pair of magnetic transducers in operative relation with both sides of a nonrigid planar magnetic recording media comprising:

a first transducer mounted relative to a first side of the media and having a fixed position in a direction normal to the plane of the media despite movement to different positions along the plane of the media, the first transducer being disposed in data transfer position relative to the media;

a support mechanism adjacent to the second side of the media in a region opposite the first transducer;

a second transducer coupled by gimbal support means to the support mechanism in opposition to the first transducer and movable toward and away from the plane of the media; and means coupled to said support mechanism for urging said second transducer toward said first transducer and said media to maintain both transducers in operative relation with the intervening media with the first transducer serving as a fixed positional reference despite tendencies of the media to deviate in position from its nominal plane and the second transducer matingly accommodating said tendencies by virtue of its gimbal support.

2. The invention as set forth in claim 1 above, wherein said first transducer has an at least partially curved surface facing the media, the media moves along a nominal plane in the region of the transducers, and the first transducer is positioned to partially intersect the nominal plane of the media.

3. The invention as set forth in claim 2 above, wherein said first transducer has a flat surface directly opposing the media and containing a non-magnetic gap region, and wherein the second transducer has an at least substantially flat surface directly opposing the media and containing a non-magnetic gap region.

4. The invention as set forth in claim 3 above, including in addition gimbal means coupled to said support mechanism and support said second transducer, and load point means coupled to said support mechanism and engaging said second transducer.

5. A device for maintaining a pair of magnetic transducers in operative relation with opposite sides of a non-rigid magnetic recording media comprising:
  a first non-gimballed transducer mounted on a first side of the media and having a relatively fixed position relative to the plane of the media in which the first transducer is in operative relationship with the first side of the media;
  a pivotable support arm having a pivot axis in fixed spatial relationship to the first transducer, and extending along the second side of the media to a region opposite the first transducer;
  a secoond transducer coupled by gimbal means to the support arm in opposition to the first transducer and being movable relative to the plane of the media and to the first transducer; and
  means coupled to said support arm for urging said second transducer and the media toward said first transducer with a force such that close operative relationship is maintained between each transducer and the associated side of the intervening media, with tendencies of the media to deviate from its nominal plane being compensated by the second transducer.

6. The invention as set forth in claim 5 above, wherein the force exerted by said second transducer is less than approximately 20 grams.

7. The invention as set forth in claim 5 above, wherein in addition gimbal means couple the second transducer to the support arm, and means coupled to the support arm to engage a central region of the second transducer to provide a load point that is fixed relative to the arm, whereby the second transducer has two axes of freedom of movement relative to the load point.

8. The invention as set forth in claim 7 above, wherein said gimbal means comprises resilient means having a base portion coupled to said support arm, a terminal portion mounting said second transducer and a pair of relatively short resilient side arms coupling said base and terminal portions, and wherein in addition said device includes a carriage coupled to support said first transducer and a flexure spring pivotally coupling the support arm at its pivot axis to the carriage.

9. The invention as set forth in claim 5 above, wherein the support arm has a high damping coefficient, and a mass of less than approximately 3 grams.

10. The invention as set forth in claim 9 above, wherein said means for urging said support arm comprises a torsional spring coupled to said support arm.

11. The invention as set forth in claim 5 above, wherein the first transducer has an outer annular portion that is curved and a flat interior portion, and wherein the second transducer has a flat contact surface with a groove therein that is substantially parallel to the direction of relative movement of the disc.

12. In a magnetic recording system in which a carriage support two magnetic heads is shifted radially relative to a center-driven pliant magnetic disc to provide data transfer with selectable record tracks on either side of the disc, to improvement comprising:
  a first transducer fixedly coupled to the carriage for bearing against a first side of the disc in an invariant position in a direction normal to the plane of the disc;
  and means including a second gimbal mounted transducer movably coupled to the carriage for bearing against the second side of the disc in opposed relation to the first transducer, the second transducer being movable toward and away from the plane of the disc and the first transducer, said means including resilient means urging said second transducer toward said first transducer with sufficient force to maintain close operative relationship between both said transducers and the disc despite deviation of portions of the disc during movement thereof, with the second gimbal mounted transducer compensating tendencies of the pliant disc to deflect.

13. The invention as set forth in claim 12 above, wherein said first transducer is fixedly positioned perpendicular to the plane of the disc to penetrate the plane of the pliant disc.

14. The invention as set forth in claim 12 above, wherein said last mentioned means comprises a load arm and in addition short length gimbal means couple said second transducer to said load arm adjacent the end thereof.

15. The invention as set forth in claim 14 above, wherein said load arm includes a load point member engaging said second transducer in a mid-region thereof.

16. The invention as set forth in claim 14 above, wherein said first transducer has a spheroidal rim and a flat apex surface facing the disc, and said second transducer has a flat surface contained within the area of the flat apex surface and including a central air relief groove.

* * * * *

UNITED STATES PATENT AND TRADEMARK OFFICE
CERTIFICATE OF CORRECTION

PATENT NO. : 4,151,573
DATED : April 24, 1979
INVENTOR(S) : Sirjang Lal Tandon et al It is certified that error appears in the above-identified patent and that said Letters Patent are hereby corrected as shown below:

Column 2, line 1, "becase" should read --because--; line 64, after "space" and before "in" (2nd occurrence), "avilable" should read --available--. Column 3, line 32, after "system" and before "re-", "or" should read --for--. Column 4, line 49, "16" should read --36--. Column 5, line 46, "corective" should read --corrective--. Column 7, line 18, after "and" (1st occurrence) and before "said", "support" should read --supporting--; line 33, after "a" and before "transducer", "secoond" should read --second--. Column 8, line 18, after "riage" and before "two", "support" should read --supporting--.

Signed and Sealed this

Thirtieth Day of October 1979

[SEAL]

Attest:

RUTH C. MASON
Attesting Officer

LUTRELLE F. PARKER
Acting Commissioner of Patents and Trademarks